United States Patent
Varga et al.

(10) Patent No.: US 9,596,176 B2
(45) Date of Patent: Mar. 14, 2017

(54) PSEUDOWIRE SELECTION IN A PSEUDOWIRE REDUNDANCY NETWORK

(75) Inventors: Balázs Varga, Budapest (HU); Peter Balázs Gerö, Budapest (HU); Shahryar Khan, Rönninge (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 59 days.

(21) Appl. No.: 14/386,860

(22) PCT Filed: Mar. 23, 2012

(86) PCT No.: PCT/EP2012/055255
§ 371 (c)(1),
(2), (4) Date: Sep. 22, 2014

(87) PCT Pub. No.: WO2013/139406
PCT Pub. Date: Sep. 26, 2013

(65) Prior Publication Data
US 2015/0043380 A1    Feb. 12, 2015

(51) Int. Cl.
*H04L 12/24* (2006.01)
*H04L 12/721* (2013.01)
(Continued)

(52) U.S. Cl.
CPC .......... *H04L 45/68* (2013.01); *H04L 12/4641* (2013.01); *H04L 41/12* (2013.01); *H04L 45/28* (2013.01)

(58) Field of Classification Search
None
See application file for complete search history.

(56) References Cited

U.S. PATENT DOCUMENTS

| 8,160,055 B1* | 4/2012 | Nadeau | ............... H04L 12/4633 370/229 |
| 8,724,456 B1* | 5/2014 | Hong | ..................... G06F 11/00 370/225 |

(Continued)

FOREIGN PATENT DOCUMENTS

EP    2273735 A1    1/2011

OTHER PUBLICATIONS

Muley, P. et al., "Pseudowire Redundancy", IETF, Network Working Group, draft-ietf-pwe3-redundancy-06, Feb. 16, 2012, 1-15.
(Continued)

*Primary Examiner* — Chi H Pham
*Assistant Examiner* — Soon-Dong D Hyun
(74) *Attorney, Agent, or Firm* — Murphy, Bilak & Homiller, PLLC

(57) ABSTRACT

A pseudowire redundancy network comprises a plurality of pseudowires (PW13, PW 14) attached to a provider edge node (201). For selecting an active pseudowire (PW13) to be used for forwarding user traffic, the provider edge node (201) determines a local preferential forwarding status for each of the pseudowires (PW13, PW14). The determined preferential forwarding status is active for no more than one of the pseudowires (PW13, PW14). The provider edge node (201) indicates the determined local preferential forwarding status of the pseudowires (PW13, PW14) to remote provider edge nodes (203, 204). Further, the provider edge node (201) receives indications of a remote preferential forwarding status for each of the pseudowires (PW13, PW14) from the remote provider edge nodes (203, 204). The provider edge node (201) then selects that one of the pseudowires (PW13, PW14) as active for which both the local preferential forwarding status and the remote preferential forwarding status is active.

19 Claims, 7 Drawing Sheets

(51) Int. Cl.
*H04L 12/46* (2006.01)
*H04L 12/703* (2013.01)

(56) References Cited

U.S. PATENT DOCUMENTS

| | | | | |
|---|---|---|---|---|
| 8,780,699 | B1* | 7/2014 | Hasan | H04L 1/22 |
| | | | | 370/219 |
| 8,804,534 | B2* | 8/2014 | Salam | H04L 41/0226 |
| | | | | 370/241.1 |
| 2007/0008982 | A1 | 1/2007 | Voit et al. | |
| 2009/0201831 | A1 | 8/2009 | Kumar et al. | |
| 2012/0106360 | A1* | 5/2012 | Sajassi | H04L 12/437 |
| | | | | 370/245 |
| 2012/0147737 | A1* | 6/2012 | Taylor | H04L 41/0663 |
| | | | | 370/219 |
| 2012/0170449 | A1* | 7/2012 | Nakash | H04L 45/28 |
| | | | | 370/225 |
| 2012/0177054 | A1* | 7/2012 | Pati | H04L 12/4625 |
| | | | | 370/395.53 |
| 2013/0107699 | A1* | 5/2013 | Miclea | H04L 45/68 |
| | | | | 370/228 |
| 2015/0006757 | A1* | 1/2015 | Boutros | H04L 45/14 |
| | | | | 709/242 |

OTHER PUBLICATIONS

Dong, J. et al., "Pseudowire Redundancy on S-PE", IETF, Network Working Group, Internet Draft, draft-dong-pwe2-redundancy-spe-00, Oct. 24, 2011, 1-8.

Martini, L. et al., "Pseudowire Setup and Maintenance Using the Label Distribution Protocol (LDP)", IETF, Network Working Group, Request for Comments 4447, Apr. 2006, 1-35.

Muley, Praveen et al., "Pseudowire Preferential Forwarding Status Bit", IETF, Network Working Group, Internet Draft, draft-ietf-pew3-redundancy-bit-06.txt, Feb. 27, 2012, 1-36.

Unknown, Author, "Switch Site Details—Dual SmartEdge", Ericsson, IP RAN T11B, 2010, 1-83.

* cited by examiner

PSEUDOWIRE SELECTION IN A PSEUDOWIRE REDUNDANCY NETWORK

TECHNICAL FIELD

The present invention relates to methods for pseudowire selection in a pseudowire redundancy network and to corresponding devices.

BACKGROUND

In communication networks, it is known to use pseudowire (PW) technology for establishing connections over a packet-switched network. In this connection, a PW may be regarded as an emulation of a point-to-point connection over the packet-switched network. PW technology is subject to various standards, e.g., Internet Engineering Task Force (IETF) RFC 3985.

For scenarios where resiliency is needed, PW redundancy networks may be used. In a PW redundancy network, a plurality of PW may be provided in a redundant manner so that in the case of a fault one PW can be replaced by another. Proposals for a PW resiliency architecture using PW redundancy can be found in the IETF draft entitled "Pseudowire Redundancy", draft-ietf-pwe3-redundancy-06 dated Feb. 16, 2012.

In a PW redundancy network, mechanisms for selecting between multiple redundant PWs are needed. In this connection, the IETF draft entitled "Pseudowire Preferential Forwarding Status Bit", draft-ietf-pwe3-redundancy-bit-06, dated Feb. 27, 2012 defines a "Preferential Forwarding" status bit by means of which a Provider Edge (PE) node on one end of a PW can indicate the preferential forwarding state of the PW to a remote PE at the other end of the PW. According to this IETF draft, an independent mode of operation may be used for PW selection. In the independent mode, a PW is selected as "active", i.e., used for forwarding user traffic, when the Preferential Forwarding status bit indicates that the preferential forwarding status is active at both PE nodes. For cases in which this condition is met by multiple PWs, local precedence parameters may be configured in the PE nodes so that a single active PW may be selected. In independent mode, the precedence parameters apply to PWs for which the preferential forwarding status was already determined to be active.

A PW redundancy architecture working according to the above principles is schematically illustrated in FIG. 1. The PW redundancy architecture of FIG. 1 includes PE nodes 21, 22, 23, 24, also denoted as $PE_1$, $PE_2$, $PE_3$, $PE_4$, and PWs PW13, PW14, PW23, PW24 provided between the PE nodes 21, 22, 23, 24. More specifically, the PW PW13 extends between the PE node 21 and the PE node 23, the PW PW14 extends between the PE node 21 and the PE node 24, the PW PW23 extends between the PE node 22 and the PE node 23, and the PW PW24 extends between the PE node 22 and the PE node 24. Further, the PW redundancy architecture of FIG. 1 includes an attachment circuit (AC) 31 connected to the PE node 21, an AC 32 connected to the PE node 22, an AC 33 connected to the PE node 23, and an AC 34 connected to the PE node 24.

In the PW redundancy architecture of FIG. 1, one of the ACs 31, 32 and one of the ACs 33, 34 is selected first. This selection may be performed by Customer Edge (CE) nodes coupled to the ACs 31, 32, 33, 34. In the scenario of FIG. 1, it is assumed that the upper ones, e.g., AC 31 and AC 33 are selected. The PE node that is attached to the selected AC, in the illustrated scenario the PE node 21 and the PE node 23, sets the Preferential Forwarding status bit as active for both of its attached PWs. In the illustrated scenario, the PE node 21 sets the Preferential Forwarding status bit for the PW PW13 and for the PW PW13 as active. Similarly, the PE node 23 sets the Preferential Forwarding status bit for the PW PW13 and for the PW PW23 as active. The PE node attached to a non-selected AC, in the illustrated scenario the PE node 22 and the PE node 24, sets the Preferential Forwarding status bit as "standby", i.e., not used for forwarding user traffic, for all attached PWs. In the illustrated scenario, the PE node 22 sets the Preferential Forwarding status bit for the PW PW23 and for the PW PW24 as standby. Similarly, the PE node 24 sets the Preferential Forwarding status bit for the PW PW14 and for the PW24 as standby. In the illustrated scenario, due to the above criterion for selecting a PW as active in the independent mode, forwarding of traffic will only be enabled on the PW PW 13 for which both the PE node 21 and the PE node 23 have set the Preferential Forwarding status bit to declare the preferential forwarding status as active.

In order to provide resiliency in the PW redundancy architecture of FIG. 1, communication between PE nodes of the same side is needed, e.g., between PE node 21 and PE node 22 on the left side or between PE node 23 and PE node 24 on the right side. For example, if PE node 23 fails in the scenario of FIG. 1, PE node 24 needs to declare the preferential forwarding status of its attached PWs, i.e., the PWs PW14 and PW24, as active. Consequently, the PE node 24 needs to be aware of the status of the PE node 23 or the AC 33. Such communication between PE nodes on the same side of a PE redundancy network increases complexity of implementation.

In view of the above, there is a need for techniques which allow for efficiently implementing PW selection in a PW redundancy network.

SUMMARY

According to an embodiment of the invention, a method of PW selection in a PW redundancy network is provided. The PW redundancy network comprises a plurality of PWs attached to a PE node. According to the method, the PE node determines a local preferential forwarding status for each of the PWs. The determined preferential forwarding status is active for no more than one of the PWs. The PE node indicates the determined local preferential forwarding status of the PWs to remote PE nodes. Further, the PE node receives indications of a remote preferential forwarding status for each of the PWs from the remote PE nodes. The PE node selects that one of the PWs as active for which both the local preferential forwarding status and the remote preferential forwarding status is active.

According to a further embodiment of the invention, a PE node for a PW redundancy network is provided. The PE node comprises a forwarder and a PW selection logic. The forwarder is configured to forward traffic between a plurality of PWs and at least one AC for connecting to one or more CE nodes. The PW selection logic is configured to determine a local preferential forwarding status for each of the PWs. The determined local preferential forwarding status is active for no more than one of the PWs. Further, the PW selection logic is configured to indicate the determined local preferential forwarding status of the PWs to remote PE nodes and to receive indications of a remote preferential forwarding status for each of the PWs from the remote PE nodes. In addition, the PW selection logic is configured to select that one of the PWs as active for which both the local preferential forwarding status and the remote preferential forwarding status is active.

According to a further embodiment of the invention, a PW redundancy system is provided. The PW redundancy system comprises a first PE node and a second PE node. The first PE node comprises a first forwarder and a first PW selection logic. The second PE node comprises a second forwarder and a second PW selection logic. The first forwarder is configured to forward traffic between a first plurality of PWs and at least one first AC for connecting to one or more CE nodes. The first PW selection logic is configured to determine a local preferential forwarding status for each of the first plurality of PWs. The determined local preferential forwarding status being active for only one of the PWs from the first plurality of PWs. Further, the first PW selection logic is configured to indicate the determined local preferential forwarding status of the first plurality of PWs to remote PE nodes and to receive indications of a remote preferential forwarding status for each of the first plurality of PWs from the remote PE nodes. In addition, the first PW selection logic is configured to select that one of from the first plurality of PWs as active for which both the local preferential forwarding status and the remote preferential forwarding status is active. The second forwarder is configured to forward traffic between a second plurality of PWs and at least one second AC for connecting to one or more CE nodes. The second PW selection logic is configured to determine a local preferential forwarding status for each of the second plurality of PWs. The determined local preferential forwarding status being active for only one of the PWs from the second plurality of PWs. Further, the second PW selection logic is configured to indicate the determined local preferential forwarding status of the second plurality of PWs to remote PE nodes and to receive indications of a remote preferential forwarding status for each of the second plurality of PWs from the remote PE nodes. In addition, the second PW selection logic is configured to select that one of from the second plurality of PWs as active for which both the local preferential forwarding status and the remote preferential forwarding status is active.

The PW redundancy system may also comprise the CE node or CE nodes connected to the first PE node and to the second PE node, and the CE node may be configured to perform load balancing between the PW selected as active from the first plurality of PWs and the PW selected as active from the second plurality of PWs.

Features and advantages of the above and further embodiments of the invention will be apparent from the following detailed description and the accompanying drawings.

DETAILED DESCRIPTION OF EMBODIMENTS

In the following, the invention will be explained in more detail by referring to exemplary embodiments and to the accompanying drawings. The illustrated embodiments relate to concepts of selecting a PW in a PW redundancy network. In the following explanations, it will be assumed that the PW redundancy network is generally implemented in accordance with the IETF PWE3 standards, i.e., in accordance with IETF RFC 3985 and standards or proposals derived therefrom. The PW redundancy network may be a Multi-Protocol Label Switching Transport Profile (MPLS-TP) network. However, the concepts as described herein may also be applied to other types of PW redundancy networks.

Figure 1:
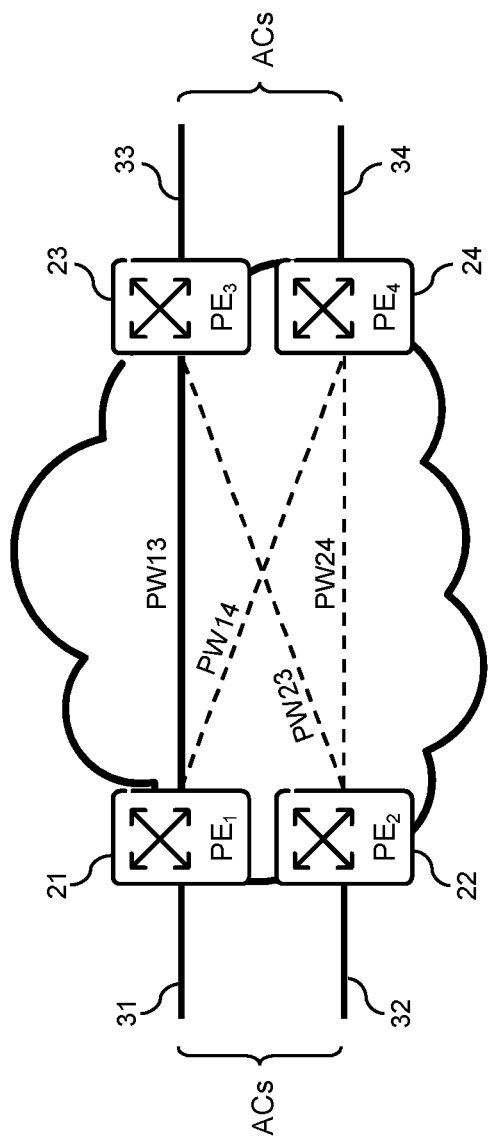
FIG. 1 schematically illustrates a known PW redundancy architecture.
Figure 2:
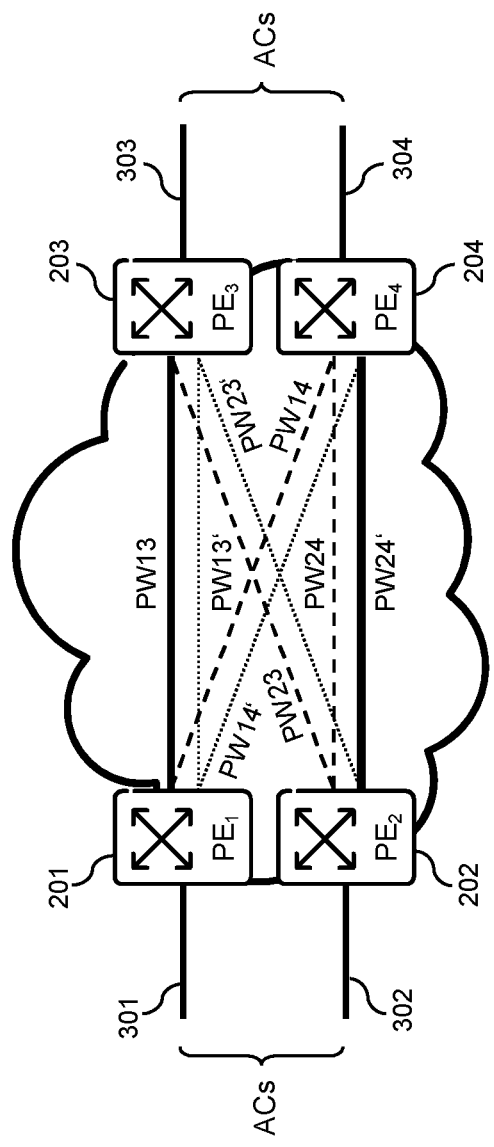
FIG. 2 schematically illustrates a PW redundancy architecture according to an embodiment of the invention.

The PW redundancy network is schematically illustrated in FIG. 2. The PW redundancy network includes PE nodes 201, 202, 203, 204, also denoted as $PE_1$, $PE_2$, $PE_3$, $PE_4$, and PWs PW13, PW14, PW23, PW24, PW13', PW14', PW23', PW24' provided between the PE nodes 201, 202, 203, 204. More specifically, the PW PW13 and the PW13' extend between the PE node 201 and the PE node 203, the PW PW14 and the PW14' extend between the PE node 201 and the PE node 204, the PW PW23 and the PW23' extend between the PE node 202 and the PE node 203, and the PW PW24 and the PW24' extend between the PE node 202 and the PE node 204. Further, the PW redundancy network of FIG. 2 includes an AC 301 connected to the PE node 201, an AC 302 connected to the PE node 22, an AC 303 connected to the PE node 203, and an AC 304 connected to the PE node 204.

According to the concepts as described herein, a PE node, e.g., one of the nodes 201, 202, 203, 204 determines the preferential forwarding status of the PWs attached to the PE node. This is accomplished in such a way that the preferential forwarding status is active for no more than a single one of the PWs attached to the PE node, e.g., by applying local preferences. The preferential forwarding status of the other PWs attached to the PE node may be determined as standby. In this connection, the forwarding status being active means that the PW is used for forwarding user traffic. The forwarding status being standby means that the PW is not used for forwarding user traffic. Irrespective of the forwarding status being active or standby, the PW may also be used for forwarding Operations, Administration and Maintenance (OAM) traffic and control plane traffic. The PE node may then indicate the preferential forwarding status of the PWs to a remote PE node and receive indications of a remote preferential forwarding status of the PWs as determined at the remote PE nodes, e.g., using a Preferential Forwarding status bit in the PWE3 control protocol of IETF RFC 4447. The PE node may then select that one of the PWs as active for which both the local preferential forwarding status and the remote preferential forwarding status is active.

By using the above selection process consistently in the different PE nodes, the PW redundancy network can autonomously select one or more PWs to be used for forwarding. In particular, while the selection uniquely identifies a PW to be used for forwarding by a particular PE node, multiple active PWs in parallel may exist between different PE nodes, thereby allowing for implementing load balancing between such PWs. Further, by applying the local preferences when determining the preferential forwarding status of the PWs, the selection can be performed without relying on external inputs, e.g., input from CE nodes or input indicating the status of ACs. Further, also signaling between PE nodes on the same side of the PW redundancy network can be avoided. This will now be further explained by referring to the exemplary scenario of FIG. 2.

In the scenario of FIG. 2, each PE node 201, 202, 203, 204 is assumed to have determined the preferential forwarding status of the PWs attached to the PE node in such a way that preferential forwarding status is active for only one of the attached PWs. In the illustrated scenario, the preferential forwarding status as determined by the PE node 201 is active only for the PW PW13, whereas the preferential forwarding status determined by the PE node 201 for the PWs PW14, PW13', and PW14' is standby. The preferential forwarding status as determined by the PE node 202 is active only for the PW PW24', whereas the preferential forwarding status determined by the PE node 202 for the PWs PW23, PW24, and PW23' is standby. The preferential forwarding status as determined by the PE node 203 is active only for the PW PW13, whereas the preferential forwarding status determined by the PE node 203 for the PWs PW23, PW13', and PW23' is standby. The preferential forwarding status as determined by the PE node 204 is active only for the PW PW24', whereas the preferential forwarding status determined by the PE node 204 for the PWs PW14, PW24, and PW24' is standby.

As illustrated by the solid lines, this selection enables forwarding of user traffic between the PE node 201 and the PE node 203 via the PW13 and at the same time enables forwarding of user traffic PE node 202 and the PE node 204 via the PW PW24'. Accordingly, the PW PW13 and the PW PW24' can be used for implementing load balancing in the PW redundancy network with multiple active ACs 301, 302, 303, 304. For this purpose, different Virtual Local Area Networks (VLANs) may be used on the ACs, and these different VLANs may be assigned to different redundant PWs. For example, the AC 301 could carry a first group of VLANs which are mapped to the group of PWs including PWs PW13, PW14, PW23, and PW24, from which PW PW13 is selected, and the AC 302 could carry a second group of VLANs which are mapped to the group of PWs including PWs PW13', PW14', PW23', and PW24', from which PW PW24' is selected. For the first group of VLANs the PW selected for forwarding is terminated at the PE node 201 attached to the AC 301, and for the second group of VLANs other VLANs, the PW selected for forwarding is terminated at the PE node 202 attached to the AC 302.

In the above concepts, each PE node may autonomously, e.g., without relying on signaling indicating the status of ACs, select a single PW as active. A single PW can be selected for each VLAN or group of VLANs carried by the AC connected to the PE node. For selecting the single PW, first the preferential forwarding status of only a single attached PW is determined to be active, e.g., using local preferences defined by local preference data configured in the PE node. Such local preference data may for example define a precedence order of the attached PWs.

Figure 3:
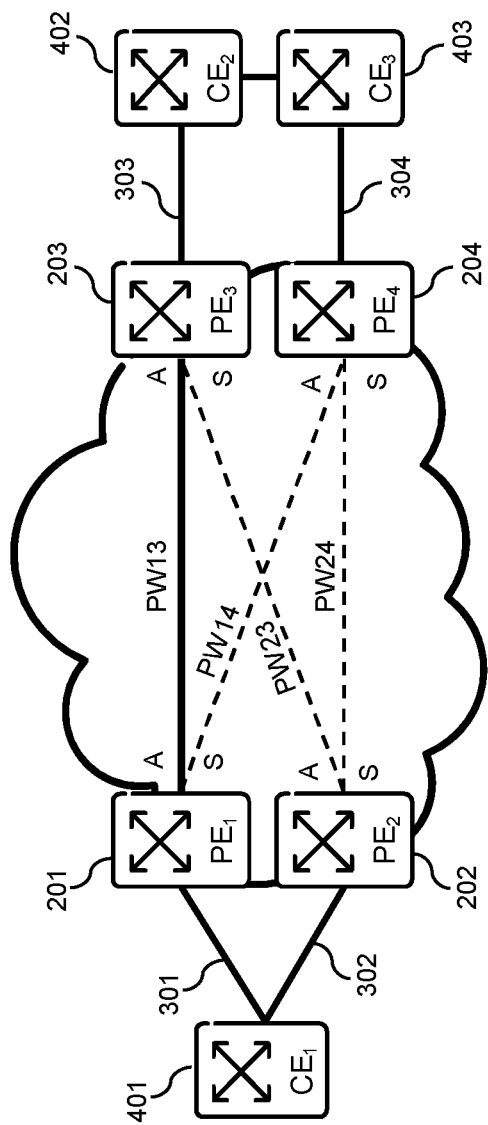
FIG. 3 schematically illustrates an exemplary scenario of applying local preferences in a PW selection method according to an embodiment of the invention.

An example of using such local preference data to select a single PW of the PW redundancy network is illustrated in FIG. 3. Elements of FIG. 3 which correspond to those of FIG. 2 have been provided with the same reference signs, and further details concerning these elements can be taken from the description in connection with FIG. 2. The group of PWs PW13', PW14', PW23', PW24' are not illustrated but may be present as well. In addition, FIG. 3 also illustrates a first CE node 401, a second CE node 402, and a third CE node 403. The first CE node 401 connected via the AC 301 to the PE node 201. Further, the first CE node 401 is connected via the AC 302 to the PE node 202. The second CE node 402 is connected via the AC 303 to the PE node 203, and the third CE node 403 is connected via the AC 304 to the PE node 204. The second CE node 402 and the third CE node 403 are connected to each other to allow for exchanging control signaling so that the second CE node 402 and the third CE node 403 can be used in a redundant manner. Accordingly, the PW redundancy network may be implemented with redundant PE nodes connected to the same CE node, such as the PE nodes 201, 202 which are connected to the first CE node 301, and/or with redundant PE nodes and connected to different redundant CE nodes, such as the PE nodes 203, 204 which are connected to the second CE node 402 and to the third CE node 403, respectively.

The, CE nodes 401, 402, 403 and the PE nodes 201, 202, 203, 204 may be configured consistently to use a certain one of the available ACs, e.g., depending on a service type of the forwarded traffic, provided that more than one operational AC is available at a CE node or at a PE node. For the PE nodes 201, 202 which are connected to the same CE node 401, this can be achieved by local configuration of the CE node 401. For the PE nodes 203, 204, which are connected to different CE nodes 402, 403, this can be achieved by Internet Protocol (IP) configuration settings in the CE nodes 402,403. Alternatively, if the CE nodes 402, 403 are Ethernet switches, known learning procedures of the Medium Access Control layer may be used to adapt the CE nodes 402, 403 to the PW selection of in the PW redundancy network.

In the exemplary scenario of FIG. 3, it is assumed that local preference data in the PE node 201 define the PW PW13 to be preferred over the PW PW14, that local preference data in the PE node 202 define the PW PW23 to be preferred over the PW PW24, that local preference data in the PE node 203 define the PW PW13 to be preferred over the PW PW23, and that local preference data in the PE node 204 define the PW PW14 to be preferred over the PW PW24. This can for example be achieved by assigning precedence values to each of the PWs attached to the respective PE node. For example, a lower precedence value may indicate a higher preference.

Using these local preference data in the above PW selection process, the PE node 201 determines the preferential forwarding status of the PW PW13 to be active, in FIG. 3 indicated by "A", and determines the preferential forwarding status of the PW PW14 to be standby, in FIG. 3 indicated by "S". The PE node 202 determines the preferential forwarding status of the PW PW23 to be active, in FIG. 3 indicated by "A", and determines the preferential forwarding status of the PW PW24 to be standby, in FIG. 3 indicated by "S". The PE node 203 determines the preferential forwarding status of the PW PW13 to be active, in FIG. 3 indicated by "A", and determines the preferential forwarding status of the PW PW23 to be standby, in FIG. 3 indicated by "S". The PE node 204 determines the preferential forwarding status of the PW PW14 to be active, in FIG. 3 indicated by "A", and determines the preferential forwarding status of the PW PW24 to be standby, in FIG. 3 indicated by "S". Accordingly, there is only one PW in the PW redundancy network for which the preferential forwarding status is active at both endpoints, namely the PW PW13 as indicated by the solid line. Generally such behaviour can be achieved by defining the local preference data consistently in such a way that the PE nodes on the one side of the PW redundancy network prefer the same remote PE node on the other side of the PW redundancy network, or more generally use the same order of preference of PE nodes on the other side of the network. In the scenario of FIG. 3 this means that the PE nodes 201 and 202, both located on one side of the PW redundancy network, both prefer the PW to the PE node 303 over the PW to the PE node 304. Similarly, this means that the PE nodes 203 and 204, both located on one side of the PW redundancy network, both prefer the PW to the PE node 201 over the PW to the PE node PE mode 202.

In the case of a fault of a PW, which may involve a fault of the AC or the PE node at one of the endpoints of the PW, status propagation signaling may be used to inform the remote PE node that the status of the PW is down, i.e., not available for forwarding. Such status propagation signaling may for example be implemented in accordance with IETF RFC 4447. The PE nodes may not be allowed to declare the preferential forwarding status of a PW as active if the status of the PW is down.

Similar concepts may be applied for PW selection in the group of PWs PW13', PW14', PW23', PW24' which may be mapped to another group of VLANs or service(s) than the group of PWs PW13, PW14, PW23, PW24. For this purpose, the local preference data may be defined per group of PWs which are mapped to a certain group of VLANs or services.

Figure 4:
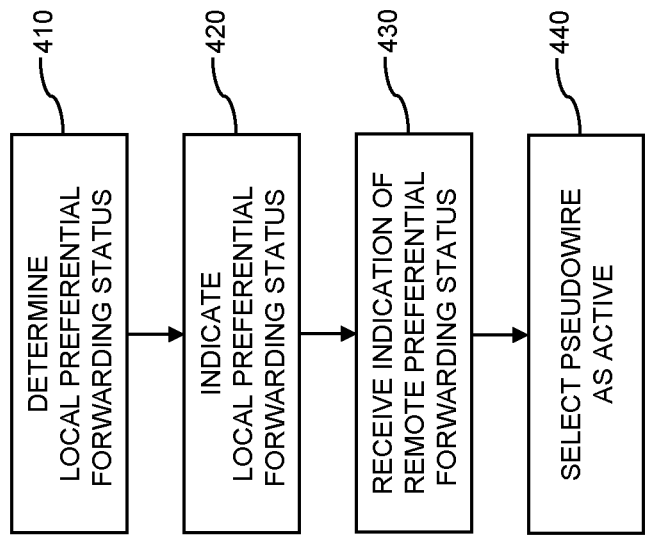
FIG. 4 shows a flowchart for schematically illustrating a method according to an embodiment of the invention.

FIG. 4 shows a flowchart for illustrating a method which may be used for implementing the above concepts for selecting a PW from a plurality of PWs attached to a PE node. For example, the method may be implemented in one of the PE nodes 201, 202, 203, 204.

At step 410, the PE node determines a local preferential forwarding status for each of the PWs. This is accomplished in such a way that the determined preferential forwarding status is active for no more than one of the PWs. Typically, the preferential forwarding status as determined by the PE node is active for one of the PWs. The determined preferential forwarding status of the other PWs attached to the PE node may be standby.

For determining the preferential forwarding status, the PE node may use local preference data. The local preference data may for example define a precedence order of the PWs. In this case, the PE node may determine the local preferential forwarding status of the PWs in response to a change of the local preference data, e.g., when the local preference data are reconfigured in the PE node.

The PE node may determine the local preferential forwarding status of the PWs independently from a status of one or more ACs for connecting the PE node to one or more CE nodes, e.g., by using the local preference data as explained above. Here, the status of the AC may be defined by whether the AC is active or standby. Alternatively or in addition, the status of the AC may be defined by whether the AC is up, i.e., operational, or down, i.e., not operational.

The PE node may also determine the local preferential forwarding status of the PWs on the basis of an operational status of one or more of the PWs. For example, the PE node may refrain from determining one of the PWs as active if the operational status of the PW is down. This may also result in situations where for none of the attached PWs the determined preferential forwarding status is active. In such scenarios where the determined preferential forwarding status depends on the operational status of one or more PWs, the PE node may also determine the local preferential forwarding status of the PWs in response to a change of the operational status of one or more of the PWs.

At step 420, the PE node indicates the determined local preferential forwarding status of the PWs to remote PE nodes, e.g., in the form of Preferential Forwarding status bits. The PE node is one endpoint of the PWs attached to the PE node. The remote PE nodes are the respective other endpoints of the PWs. For example, if the PE node corresponds to the PE node 201 or 202 of FIGS. 2 and 3, the remote PE nodes may be the PE nodes 203 and 204. Similarly, if the PE node corresponds to the PE node 203 or 204 of FIGS. 2 and 3, the remote PE nodes may be the PE nodes 201 and 202.

At step 430, the PE node receives indications of a remote preferential forwarding status for each of the PWs from the remote PE nodes, e.g., in the form of Preferential Forwarding status bits.

At step 440, the PE node selects that one of its attached PWs as active for which both the local preferential forwarding status and the remote preferential forwarding status is active. The selected active PW may then be used for forwarding user traffic between the PE node and the remote PE node which constitutes the other endpoint of the selected PW.

Figure 5:
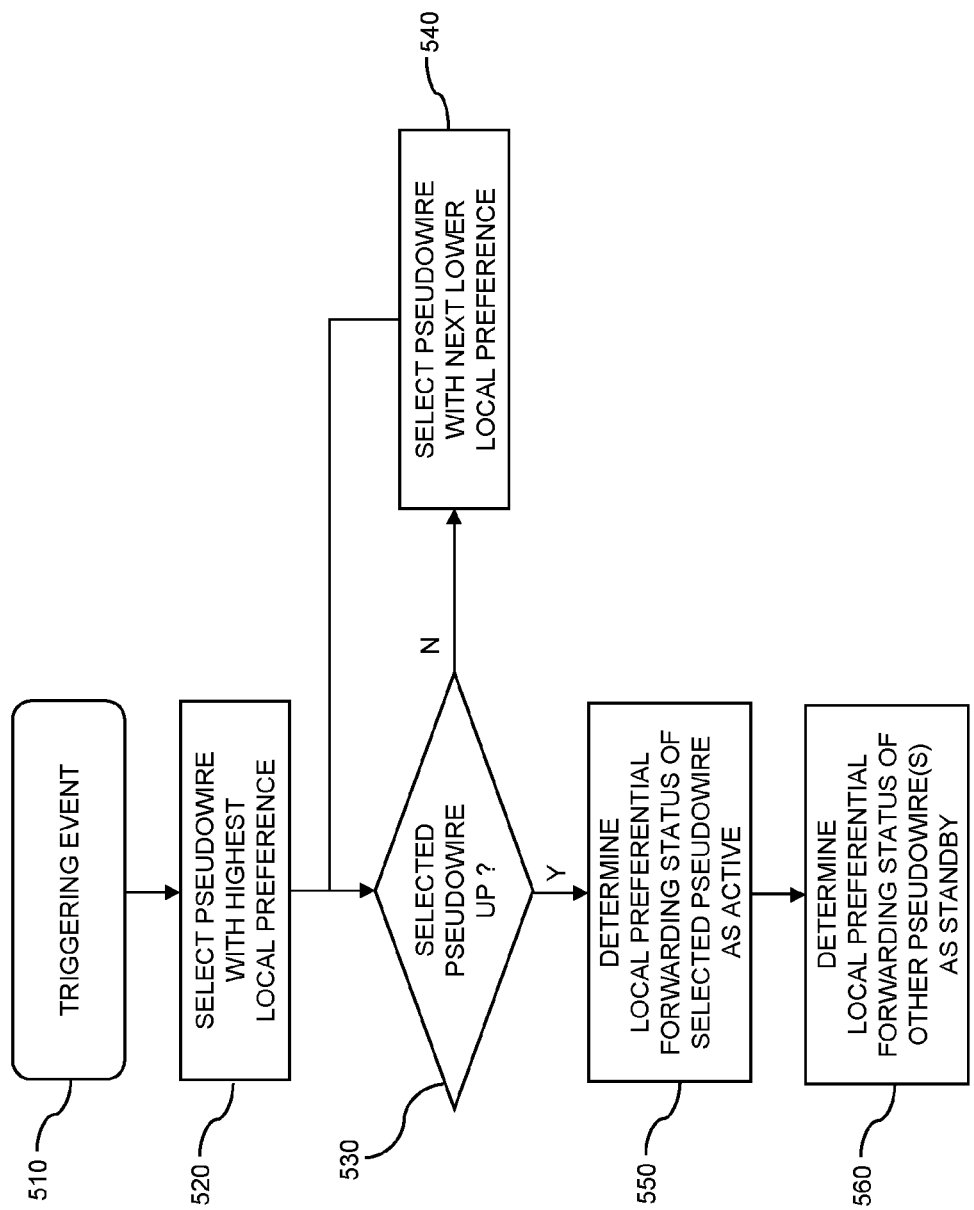
FIG. 5 shows a flowchart for schematically illustrating a further method according to an embodiment of the invention.

FIG. 5 illustrates further details of an exemplary method for determining the preferential forwarding status of the PWs which may be applied in step 410 of FIG. 4. The method of FIG. 5 is based on using local preference data in the form of a precedence order.

The method may be performed in response to a triggering event 510. For example, the triggering event may be a change of the local preference data or a change of the operational status of one or more of the PWs attached to the PE node.

At step 520, the PE node selects that one of the attached PWs for which the local preference data indicate the highest local preference.

At step 530, the PE node determines whether the operational status of the selected PW is up, i.e., whether the selected PW is actually available for routing. If this is not the case, as indicated by branch "N", the method continues with step 540.

At step 540, the PE node selects the PW with the next higher preference according to the local preference data, and then repeats step 530.

If the determination of step 530 reveals that the operational state of the selected PW is up, the method continues with step 550, as indicated by branch "Y".

At step 550, the PE node determines the local preferential forwarding status of the selected PW as active.

At step 560, the PE node determines the local preferential forwarding status of the other PWs as standby.

By applying the method of FIG. 5, the PE node may select that one from its attached PWs which is operationally up and has the highest local preference. The preferential forwarding status of this PW may then be determined as active while the preferential forwarding status of the others is determined as standby.

Figure 6:
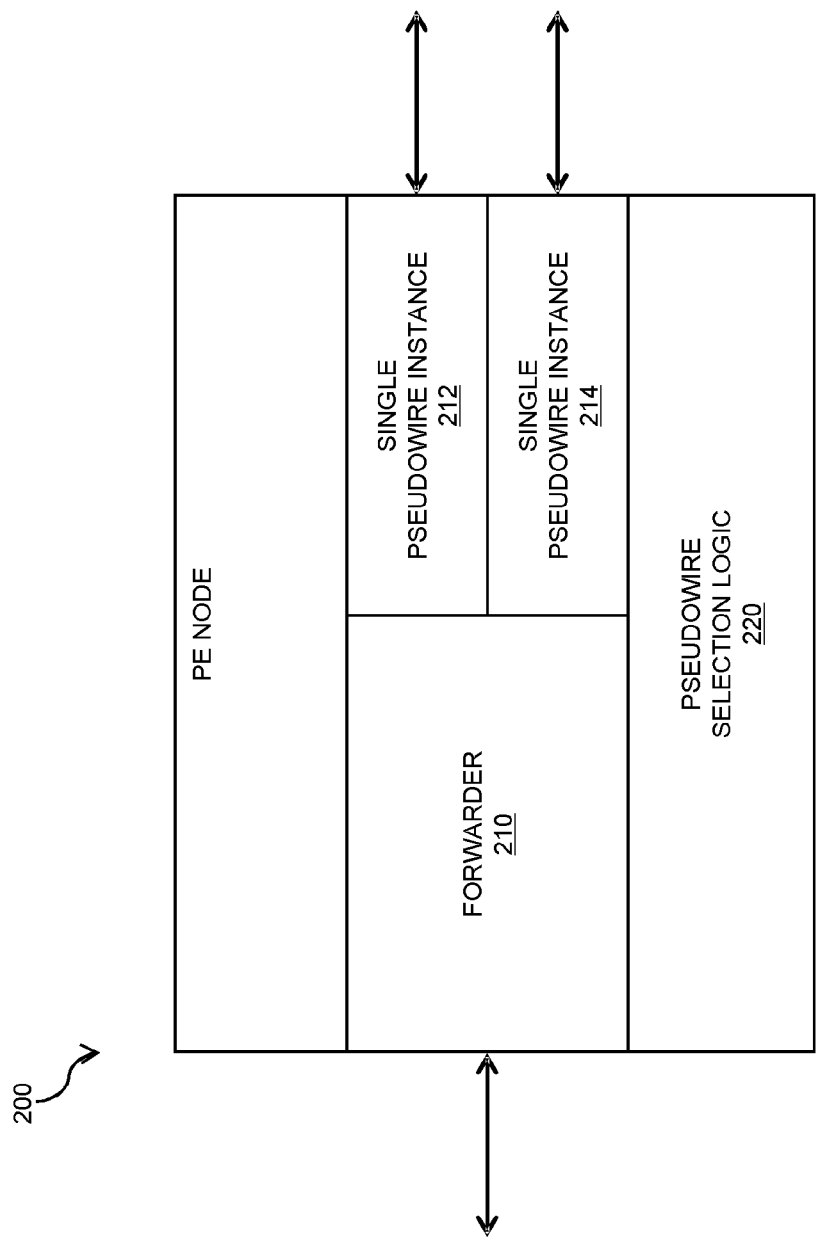
FIG. 6 schematically illustrates a PE node according to an embodiment of the invention.

FIG. 6 shows a block diagram for schematically illustrating a PE node 200 configured to implement the above concepts and methods. The PE node 200 of FIG. 6 may correspond to any one of the above-mentioned PE nodes 201, 202, 203, 204.

As illustrated, the PE node 200 includes a forwarder 210, a number of single PW instances 212, 214. Further, the PE node 200 includes a PW selection logic 220.

The forwarder 210 is configured to forward traffic between a plurality of PWs, attached to the PE node 200 via the single PW instances 212, 214, and at least one AC for connecting to one or more CE nodes. The forwarder 210 may forward traffic received from a certain AC to one of the PWs as selected by the PW selection logic 220. Further, the forwarder 210 may perform the inverse operation on traffic received from the selected PW.

The single PW instances 212, 214 act as interfaces to the different PWs attached to the PE node 200. Typically, the single PW instances 212, 214 are implemented as virtual interfaces. Accordingly, the single PW instances may be realized by using a single physical interface.

The PW selection logic 220 is configured to implement the above-described concepts and methods of PW selection. For this purpose, the PW selection logic may determine a local preferential forwarding status for each of the PWs attached to the PE node. The determined local preferential forwarding status is active for no more than one of the PWs, typically for a single one of the PWs. Further, the PW selection logic 220 is configured to indicate the determined local preferential forwarding status of the PWs to remote PE nodes and to receive indications of a remote preferential forwarding status for each of the PWs from the remote PE nodes. In addition, the PW selection logic 220 is configured to select that one of the attached PWs as active for which both the local preferential forwarding status and the remote preferential forwarding status is active.

Figure 7:
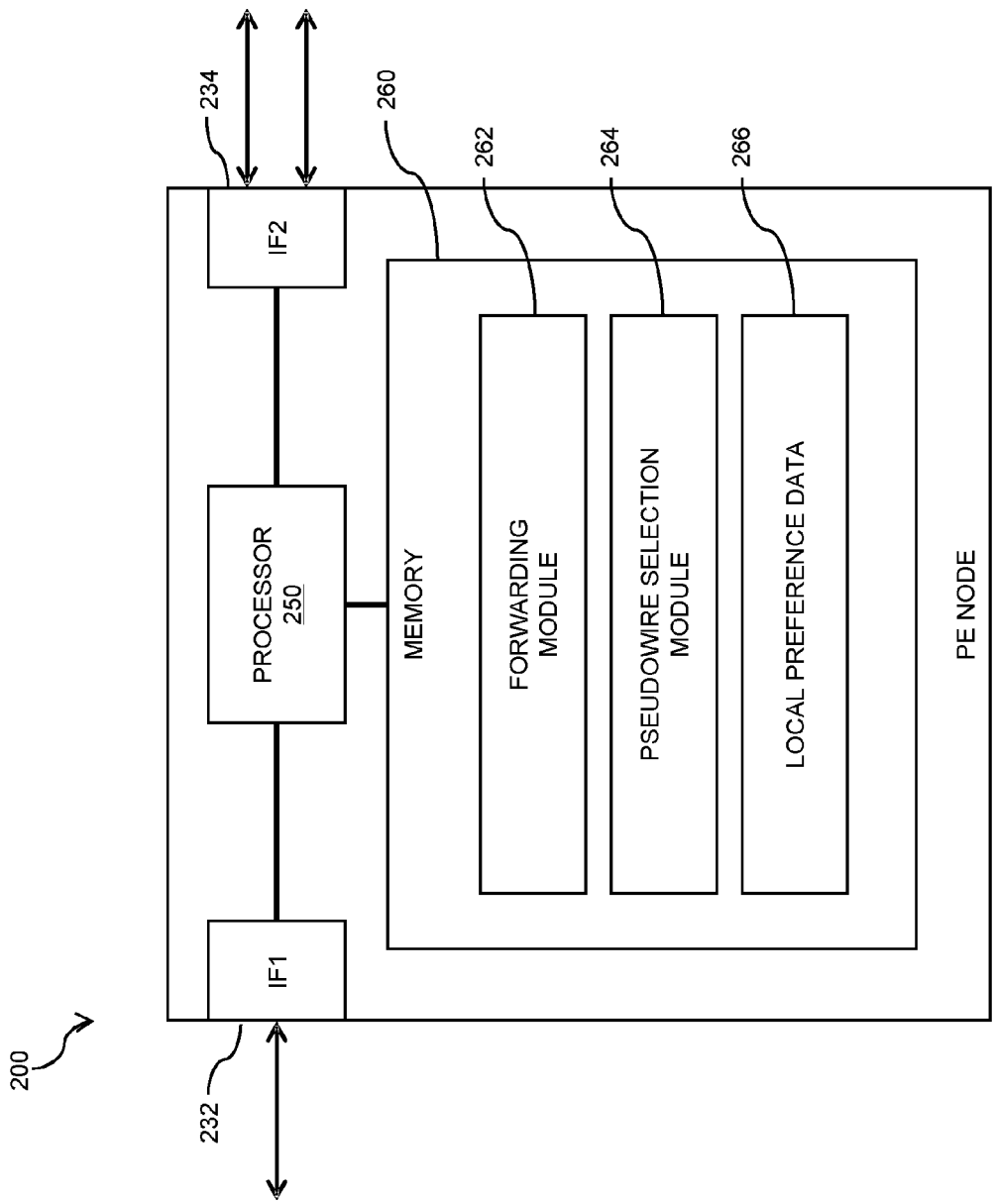
FIG. 7 schematically illustrates a processor-based implementation of a PE node according to an embodiment of the invention.

FIG. 7 schematically illustrates a processor-based implementation of the PE node 200. In the illustrated implementation, the PE node 200 includes a first interface (IF1) 232 for connecting to one or more AC and a second interface (IF2) for connecting to a plurality of PWs. It is to be understood that for implementing transmitter (TX) functionalities the interfaces 232, 242 may include one or more transmitters, and that for implementing receiver functionalities the interfaces 232, 234 may include one or more receivers. The detailed implementation of the interface 232, 234 may be determined in accordance with the type of the AC and transmitted service. The detailed implementation of the interface 234 may be determined in accordance with the implementation of the PWs, e.g., concerning physical medium and protocols.

Further, the PE node 200 includes a processor 250 coupled to the interfaces 232, 234 and a memory 260 coupled to the processor 250. The memory 260 may include a read-only memory (ROM), e.g., a flash ROM, a random-access memory (RAM), e.g., a Dynamic RAM (DRAM) or static RAM (SRAM), a mass storage, e.g., a hard disk or solid state disk, or the like. The memory 260 includes suitably configured program code to be executed by the processor 250 so as to implement the above-described functionalities of the PE node 200. More specifically, the memory 260 may include a forwarding module 262 for implementing the above-mentioned functionalities of the forwarder 210. Further, the memory 260 may include a PW selection module 264 for implementing the above-mentioned functionalities of the PW selection logic 220. In addition, the memory 260 may include local preference data 266 to be used in the above methods of PW selection.

It is to be understood that the structure as illustrated in FIG. 7 is merely schematic and that the PE node 200 may actually include further components which, for the sake of clarity, have not been illustrated, e.g., further interfaces or additional processors. Also, it is to be understood that the memory 260 may include further types of program code modules, which have not been illustrated. For example, the memory 260 may include program code modules for implementing typical functionalities of a PE node, e.g., as known from the IETF documents cited herein. According to some embodiments, also a computer program product may be provided for implementing concepts according to embodiments of the invention, e.g., a computer-readable medium storing the program code and/or other data to be stored in the memory 260.

Each of the PE nodes 201, 202, 203, 204 of FIGS. 2 and 3 may be implemented as explained in connection with FIGS. 6 and 7, and PE nodes implemented as explained in connection with FIGS. 6 and 7 may be combined in various ways to provide a PW redundancy system. For example, such a PW redundancy system could include the PE node 201 and the PE node 202 of FIGS. 2 and 3. The forwarder 210 of the PE node 201 may then be termed as a first forwarder in the PW redundancy system, and the forwarder 210 of the PE node 202 may be termed as a second forwarder of the PW redundancy system. Similarly, the PW selection logic 220 of the PE node 201 may be termed as a first PW selection logic, and the PW selection logic of the PE node 202 may be termed as a second PW selection logic. The PW redundancy system may also include the CE node 401 connected to the PE node 201 and to the PE node 202. In scenarios in which both the PE node 201 and the PE node 202 select an active PW, as illustrated for the PWs PW13 and PW24' in the scenario of FIG. 2, the CE node 401 may perform load balancing between the multiple active PWs, e.g., by mapping a certain service or VLAN to one group of redundant PWs, e.g., the group of PWs PW13, PW14, PW23, PW24, and mapping another service or VLAN to another group of redundant PWs, e.g., the group of PWs PW13', PW14', PW23', PW24'. The ACs 301, 302 to be used for carrying the services or VLANs may then be selected in accordance with the selected active PWs.

A PW redundancy system could also include the PE node 203 and the PE node 204 of FIGS. 2 and 3. The forwarder 210 of the PE node 203 may then be termed as a first forwarder in the PW redundancy system, and the forwarder 210 of the PE node 204 may be termed as a second forwarder of the PW redundancy system. Similarly, the PW selection logic 220 of the PE node 203 may be termed as a first PW selection logic, and the PW selection logic of the PE node 204 may be termed as a second PW selection logic. The PW redundancy system may also include the CE node 402 connected to the PE node 203 and the CE node 403 connected to the PE node 204. In scenarios in which both the PE node 203 and the PE node 204 select an active PW, as illustrated for the PWs PW13 and PW24' in the scenario of FIG. 2, the CE node 402 and/or the CE node 403 may perform load balancing between the multiple active PWs, e.g., by mapping a certain service or VLAN to one group of redundant PWs, e.g., the group of PWs PW13, PW14, PW23, PW24, and mapping another service or VLAN to another group of redundant PWs, e.g., the group of PWs PW13', PW14', PW23', PW24'. The ACs 301, 302 to be used for carrying the services or VLANs may then be selected in accordance with the selected active PWs. For this purpose, the CE nodes 402, 403 may communicate with each other using the connection between the CE nodes 402, 403 as illustrated in FIG. 3.

As can be seen, the concepts as explained above may be used for efficiently selecting a PW to be used for forwarding of user traffic in a PW redundancy network. The concepts may be implemented without requiring status signaling between the PE nodes on the same side of the PW redundancy network. Therefore, the a low complexity of the PE nodes and CE nodes may be provided. Moreover, the concepts allow for load sharing on via redundant ACs and PE nodes. For example, two ACs may be simultaneously active for different services.

It is to be understood that the examples and embodiments as explained above are merely illustrative and susceptible to various modifications. For example, other methods than the method of FIG. 5 may be used to provide that a PE node selects a single PW for determining the preferential forwarding status as active. Moreover, the PW redundancy network may actually include a larger number of PE nodes and PWs. Further, it is to be understood that the above concepts may be implemented by using correspondingly designed software to be executed by a processor of an existing device or by using dedicated device hardware.

The invention claimed is:

1. A method of pseudowire selection in a pseudowire redundancy network that comprises a plurality of pseudowires attached to a provider edge node, the method comprising:
   the provider edge node determining a local preferential forwarding status for each of the pseudowires, the determined preferential forwarding status being active for no more than one of the pseudowires;
   the provider edge node indicating the determined local preferential forwarding status of the pseudowires to remote provider edge nodes;
   the provider edge node receiving indications of a remote preferential forwarding status for each of the pseudowires from the remote provider edge nodes; and
   the provider edge node selecting that one of the pseudowires as active for which both the local preferential forwarding status and the remote preferential forwarding status are active.

2. The method of claim 1, wherein the provider edge node determines the local preferential forwarding status of the pseudowires on the basis of local preference data.

3. The method of claim 2, wherein the provider edge node determines the local preferential forwarding status of the pseudowires in response to a change of the local preference data.

4. The method of claim 2, wherein the local preference data define a precedence order of the pseudowires.

5. The method of claim 1, wherein the provider edge node determines the local preferential forwarding status of the pseudowires independently from a status of one or more attachment circuits for connecting the provider edge node to one or more customer edge nodes.

6. The method of claim 1, wherein the provider edge node determines the local preferential forwarding status of the pseudowires on the basis of an operational status of one or more of the pseudowires.

7. The method of claim 6, wherein the provider edge node determines the local preferential forwarding status of the pseudowires in response to a change of the operational status of one or more of the pseudowires.

8. A provider edge node for a pseudowire redundancy network, the provider edge node comprising:
   a forwarder circuit configured to forward traffic between a plurality of pseudowires and at least one attachment circuit for connecting to one or more customer edge nodes; and
   a pseudowire selection logic circuit configured to:
      determine a local preferential forwarding status for each of the pseudowires, the determined local preferential forwarding status being active for no more than one of the pseudowires,
      indicate the determined local preferential forwarding status of the pseudowires to remote provider edge nodes,
      receive indications of a remote preferential forwarding status for each of the pseudowires from the remote provider edge nodes, and
      select that one of the pseudowires as active for which both the local preferential forwarding status and the remote preferential forwarding status is active.

9. The provider edge node of claim 8, further comprising a memory for storing local preference data, wherein the pseudowire selection logic circuit is configured to determine the local preferential forwarding status of the pseudowires on the basis of the local preference data.

10. The provider edge node of claim 9, wherein the pseudowire selection logic circuit is configured to determine the local preferential forwarding status of the pseudowires in response to a change of the local preference data.

11. The provider edge node of claim 9, wherein the local preference data define a precedence order of the pseudowires.

12. The provider edge node of claim 8, wherein the pseudowire selection logic circuit is configured to determine the local preferential forwarding status of the pseudowires independently from a status of said one or more attachment circuits for connecting the provider edge node to said one or more customer edge nodes.

13. The provider edge node of claim 8, wherein the pseudowire selection logic circuit is configured to determine the local preferential forwarding status on the basis of an operational status of the pseudowires.

14. The provider edge node of claim 13, wherein the pseudowire selection logic circuit is configured to determine the local preferential forwarding status of the pseudowires in response to a change of the operational status of one or more of the pseudowires.

15. A pseudowire redundancy system, comprising:
   a first provider edge node; and
   a second provider edge node,
   the first provider edge node comprising:
      a first forwarder circuit configured to forward traffic between a first plurality of pseudowires and at least one first attachment circuit for connecting to one or more customer edge nodes; and
      a first pseudowire selection logic circuit configured to:
         determine a local preferential forwarding status for each of the first plurality of pseudowires, the determined local preferential forwarding status being active for only one of the pseudowires from the first plurality of pseudowires,
         indicate the determined local preferential forwarding status of the first plurality of pseudowires to remote provider edge nodes,
         receive indications of a remote preferential forwarding status for each of the first plurality of pseudowires from the remote provider edge nodes, and
         select that one of from the first plurality of pseudowires as active for which both the local preferential forwarding status and the remote preferential forwarding status is active,
   the second provider edge node comprising:
      a second forwarder circuit configured to forward traffic between a second plurality of pseudowires and at least one second attachment circuit for connecting to one or more customer edge nodes; and
      a second pseudowire selection logic circuit configured to:
         determine a local preferential forwarding status for each of the second plurality of pseudowires, the determined local preferential forwarding status being active for only one of the pseudowires from the second plurality of pseudowires, indicate the determined local preferential forwarding status of the second plurality of pseudowires to remote provider edge nodes, receive indications of a remote preferential forwarding status for each of the second plurality of pseudowires from the remote provider edge nodes, and select that one of from the second plurality of pseudowires as active for which both the local preferential forwarding status and the remote preferential forwarding status is active.

16. The pseudowire redundancy system of claim 15, comprising said one or more customer edge node connected to the first provider edge node and to the second provider edge node, wherein said one or more customer edge node is configured to perform load balancing between the pseudowire selected as active from the first plurality of pseudowires and the pseudowire selected as active from the second plurality of pseudowires.

17. The pseudowire redundancy system of claim 15, wherein the first attachment circuit and the second attachment circuit are connected to the same customer edge node.

18. The pseudowire redundancy system of claim 15, wherein the first attachment circuit and the second attachment circuit are connected to different customer edge nodes.

19. The pseudowire redundancy system of claim 15, wherein the first provider edge node and the second provider edge node each comprise:

a forwarder circuit configured to forward traffic between a plurality of pseudowires and at least one attachment circuit for connecting to one or more customer edge nodes; and a pseudowire selection logic circuit configured to:

determine a local preferential forwarding status for each of the pseudowires, the determined local preferential forwarding status being active for no more than one of the pseudowires, indicate the determined local preferential forwarding status of the pseudowires to remote provider edge nodes, receive indications of a remote preferential forwarding status for each of the pseudowires from the remote provider edge nodes, and select that one of the pseudowires as active for which both the local preferential forwarding status and the remote preferential forwarding status is active.

\* \* \* \* \*